United States Patent
Mizoguchi et al.

(10) Patent No.: US 7,656,269 B2
(45) Date of Patent: Feb. 2, 2010

(54) SINTERED ELECTROCONDUCTIVE OXIDE, THERMISTER ELEMENT USING SINTERED ELECTROCONDUCTIVE OXIDE, AND TEMPERATURE SENSOR USING THERMISTER ELEMENT

(75) Inventors: Yoshihito Mizoguchi, Aichi (JP); Yasuyuki Okimura, Aichi (JP); Takeshi Mitsuoka, Aichi (JP); Kazushige Ohbayashi, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 525 days.

(21) Appl. No.: 11/658,563

(22) PCT Filed: Apr. 11, 2006

(86) PCT No.: PCT/JP2006/307627

§ 371 (c)(1), (2), (4) Date: Jan. 25, 2007

(87) PCT Pub. No.: WO2006/109792

PCT Pub. Date: Oct. 19, 2006

(65) Prior Publication Data

US 2009/0016409 A1    Jan. 15, 2009

(30) Foreign Application Priority Data

Apr. 11, 2005 (JP) .............................. 2005-113920
Apr. 11, 2005 (JP) .............................. 2005-113968
Feb. 16, 2006 (JP) .............................. 2006-039739

(51) Int. Cl.
*H01C 7/10* (2006.01)

(52) U.S. Cl. ........................ 338/22 R; 338/28; 252/500; 423/599

(58) Field of Classification Search .............. 338/22 R, 338/22 SD, 28; 252/62.2, 500, 518.1; 501/123, 501/127; 423/599, 600
See application file for complete search history.

(56) References Cited

U.S. PATENT DOCUMENTS 6,261,480 B1    7/2001    Ogata et al.
(Continued)

FOREIGN PATENT DOCUMENTS

EP        1 564 197 A1    8/2005
(Continued)

*Primary Examiner*—Kyung Lee
(74) *Attorney, Agent, or Firm*—Sughrue Mion, PLLC (57) ABSTRACT

According to an aspect of the present invention, there is provided a sintered electroconductive oxide containing a perovskite phase of perovskite-type crystal structure represented by the composition formula: $M1_aM2_bM3_cAl_dCr_eO_f$, where M1 is at least one of elements of group 3A other than La; M2 is at least one of elements of group 2A; M3 is at least one of elements of groups 4A, 5A, 6A, 7A and 8 other than Cr; and a, b, c, d, e and f satisfy the following conditional expressions:

$0.600 \leq a \leq 1.000$;

$0 \leq b \leq 0.400$;

$0.150 \leq c < 0.600$;

$0.400 \leq d \leq 0.800$;

$0 < e \leq 0.050$;

$0 < e/(c+e) \leq 0.18$; and $2.80 \leq f \leq 3.30$.

With the use of this conductive oxide sintered body, it becomes possible to carry out proper temperature measurements over the temperature range from a low temperature of −40° C. to a high temperature of 900° C. or higher.

16 Claims, 3 Drawing Sheets

U.S. PATENT DOCUMENTS

| | | |
|---|---|---|
| 6,306,315 B1 | 10/2001 | Ogata et al. |
| 6,740,261 B1 | 5/2004 | Ogata et al. |
| 2002/0020949 A1 | 2/2002 | Kuzuoka et al. |
| 2003/0205698 A1 | 11/2003 | Ogata et al. |

FOREIGN PATENT DOCUMENTS

| | | |
|---|---|---|
| JP | 10-318850 A | 12/1998 |
| JP | 11-251109 A | 9/1999 |
| JP | 2001-143907 A | 5/2001 |
| JP | 3362651 B2 | 10/2002 |
| JP | 3362659 B2 | 10/2002 |
| JP | 2003-183075 A | 7/2003 |
| JP | 2004-193572 A | 7/2004 |
| JP | 2004-217500 A | 8/2004 |
| JP | 2004-221519 A | 8/2004 |
| JP | 8-261846 A | 10/1996 |

SINTERED ELECTROCONDUCTIVE OXIDE, THERMISTER ELEMENT USING SINTERED ELECTROCONDUCTIVE OXIDE, AND TEMPERATURE SENSOR USING THERMISTER ELEMENT

TECHNICAL FIELD

The present invention relates to a sintered electroconductive oxide having electrical conductivity and changing in resistance with changes in temperature, a thermistor element using the sintered electroconductive oxide and a temperature sensor using the thermistor element.

BACKGROUND ART

Sintered electroconductive oxides having electrical conductivity and changing in resistance (specific resistance) with changes in temperature, thermistor elements using the sintered electroconductive oxides and temperature sensors using the thermistor elements are conventionally known.

Patent Document 1 discloses a sintered material for a thermistor element, which consists of Sr, Y, Mn, Al, Fe and O and has a crystal phase of a perovskite type oxide, a crystal phase of a garnet type oxide and a crystal phase of at least either a Sr—Al oxide or a Sr—Fe oxide, to enable temperature measurements over the range of 300° C. to 1000° C.

Patent Document 2 discloses a sintered electroconductive oxide material for a thermistor element, which has a composition of $M1_aM2_bM3_cM4_dO_3$ where a, b, c and d satisfy given conditional expressions, to show a suitable specific resistance over the range of room temperature to 1000° C.

Patent Document 3 discloses a thermistor element formed with a mixed sintered material $(MM')O_3 \cdot AO_x$ of a composite perovskite type oxide $(MM')O_3$ and a metal oxide $AO_x$.

Patent Document 1: Japanese Laid-Open Patent Publication No. 2004-221519

Patent Document 2: Japanese Laid-Open Patent Publication No. 2003-183075

Patent Document 3: Japanese Laid-Open Patent Publication No. 2001-143907

One use of a thermistor element is as a temperature sensor designed to detect the temperature of an exhaust gas from an automotive engine such as internal combustion engine. For protection of DPF and $NO_x$ reduction catalyst, there has recently been a demand for the thermistor element to enable temperature measurements in a high temperature range of around 900° C. There has also been a demand for the thermistor element to enable temperature measurements in a low temperature range e.g. under an engine starting or key-on state for detection of temperature sensor failure (wire break) in OBD systems (On-Board Diagnostic systems). It is especially demanded that the thermistor element be capable of carrying out temperature measurements even at a temperature of −40° C. since there may be a case where the engine starting temperature becomes below the freezing point in cold climates.

However, each of the sintered materials of Patent Documents 1 and 2 have a temperature gradient value (B-value) of about 4000 K or higher so as to show a suitable resistance change over the range of room temperature or not lower than 300° C. to 1000° C. (See e.g. TABLE 6 of Patent Document 2.) The thermistor elements using these sintered materials have a large temperature gradient value (B-value) and become too high in resistance at a low temperature of −40° C. This results in difficulty determining the resistance values of the thermistor elements and enabling temperature measurements.

The thermistor element of Patent Document 3 shows a resistance of 110Ω to 100 kΩ in the temperature range of room temperature to 1000° C. so that the temperature gradient coefficient β (corresponding to B-value) of the thermistor element can be maintained within the suitable range of 2200 to 2480 K. (See e.g. TABLE 1 of Patent Document 2.) No consideration is however given to the relationship between the metal constituent M or M' of the composite perovskite type oxide $(MM')O_3$ and the metal constituent A of the metal oxide $AO_x$. Depending on the combination of the metal element M or M' and the metal element A and the compounding ratio of these constituents, there arises a possibility that the composite perovskite type oxide $(MM')O_3$ and the metal oxide $AO_x$ react with each other to form an unexpected by-product or that the metal element A replaces the constituent element of the composite perovskite type oxide $(MM')O_3$ to cause a change in composition. This deteriorates various characteristics of the thermistor element (sintered material) such as high-temperature composition stability (heat resistance).

DISCLOSURE OF THE INVENTION

In view of the above problems, the present invention has been made to provide a sintered electroconductive oxide for enabling proper temperature measurements over the temperature range from a low temperature of −40° C. to a high temperature of 900° C. or higher, a thermistor element using the sintered electroconductive oxide and a temperature sensor using the thermistor element.

According to an aspect of the present invention, there is provided a sintered electroconductive oxide that contains a perovskite phase of perovskite-type crystal structure represented by the composition formula: $M1_aM2_bM3_cAl_dCr_eO_f$ where M1 is at least one of elements of group 3A other than La; M2 is at least one of elements of group 2A; M3 is at least one of elements of groups 4A, 5A, 6A, 7A and 8 other than Cr; and a, b, c, d, e and f satisfy the following conditional expressions:

$$0.600 \leq a \leq 1.000;$$

$$0 \leq b \leq 0.400;$$

$$0.150 \leq c < 0.600;$$

$$0.400 \leq d \leq 0.800;$$

$$0 \leq e \leq 0.050;$$

$$0 < e/(c+e) \leq 0.18; \text{ and}$$

$$2.80 \leq f \leq 3.30.$$

It is noted that: the elements of group 3A in the present invention corresponds to those of group 3 in the IUPAC system; the elements of groups 2A, 4A, 5A, 6A and 7A in the present invention correspond to those of groups 2, 4, 5, 6 and 7 in the IUPAC system, respectively; and the elements of group 8 in the present invention corresponds to those of group 8, 9 and 10 in the IUPAC system.

According to another aspect of the present invention, there are provided a thermistor element using the sintered electroconductive oxide and a temperature sensor using the thermistor element.

BEST MODE FOR CARRYING OUT THE INVENTION

Hereinafter, one exemplary embodiment of the present invention will be described below in detail with reference to the drawings.

Figure 1:
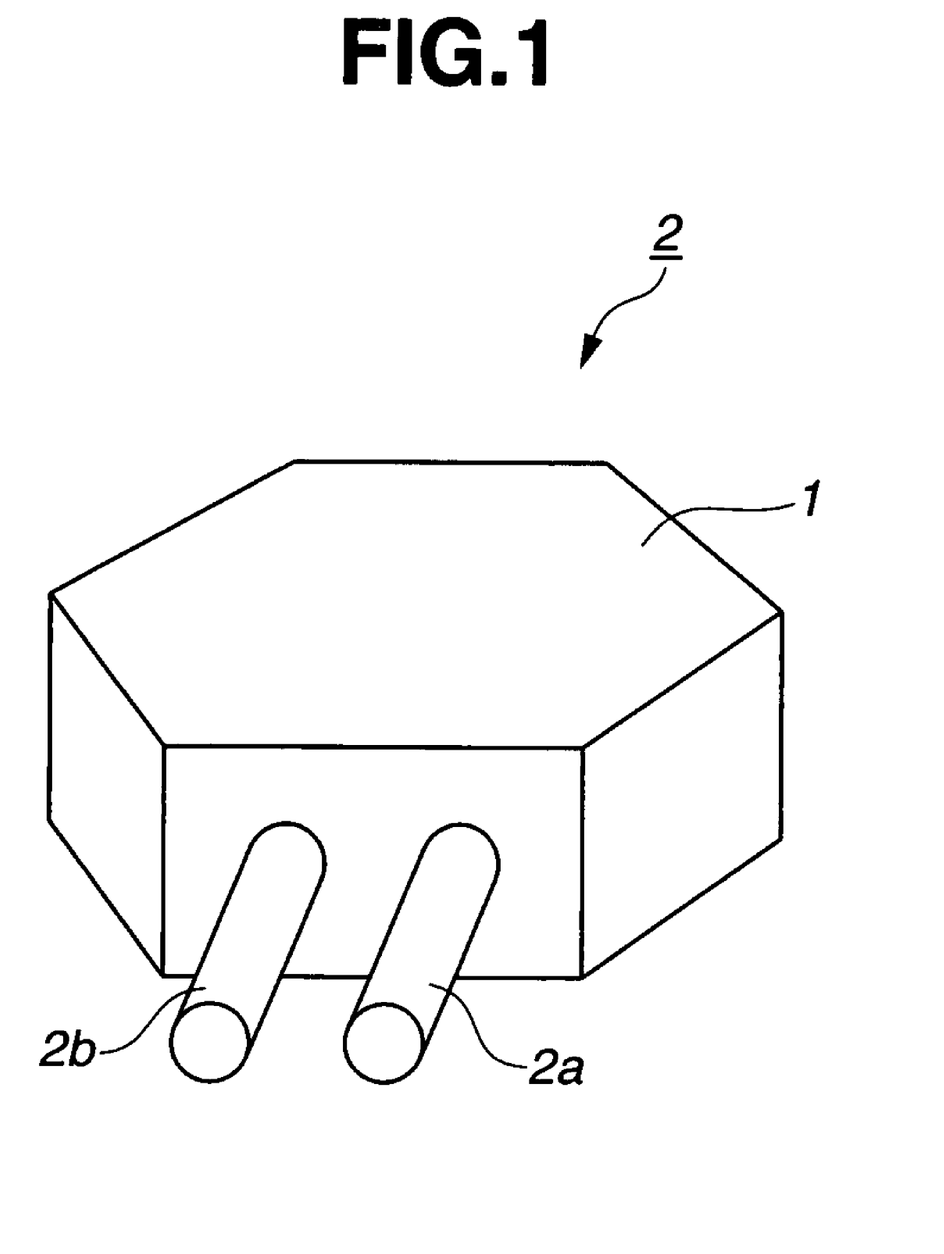
FIG. 1 is a sectional view of a thermistor element according to one exemplary embodiment of the present invention.
Figure 2:
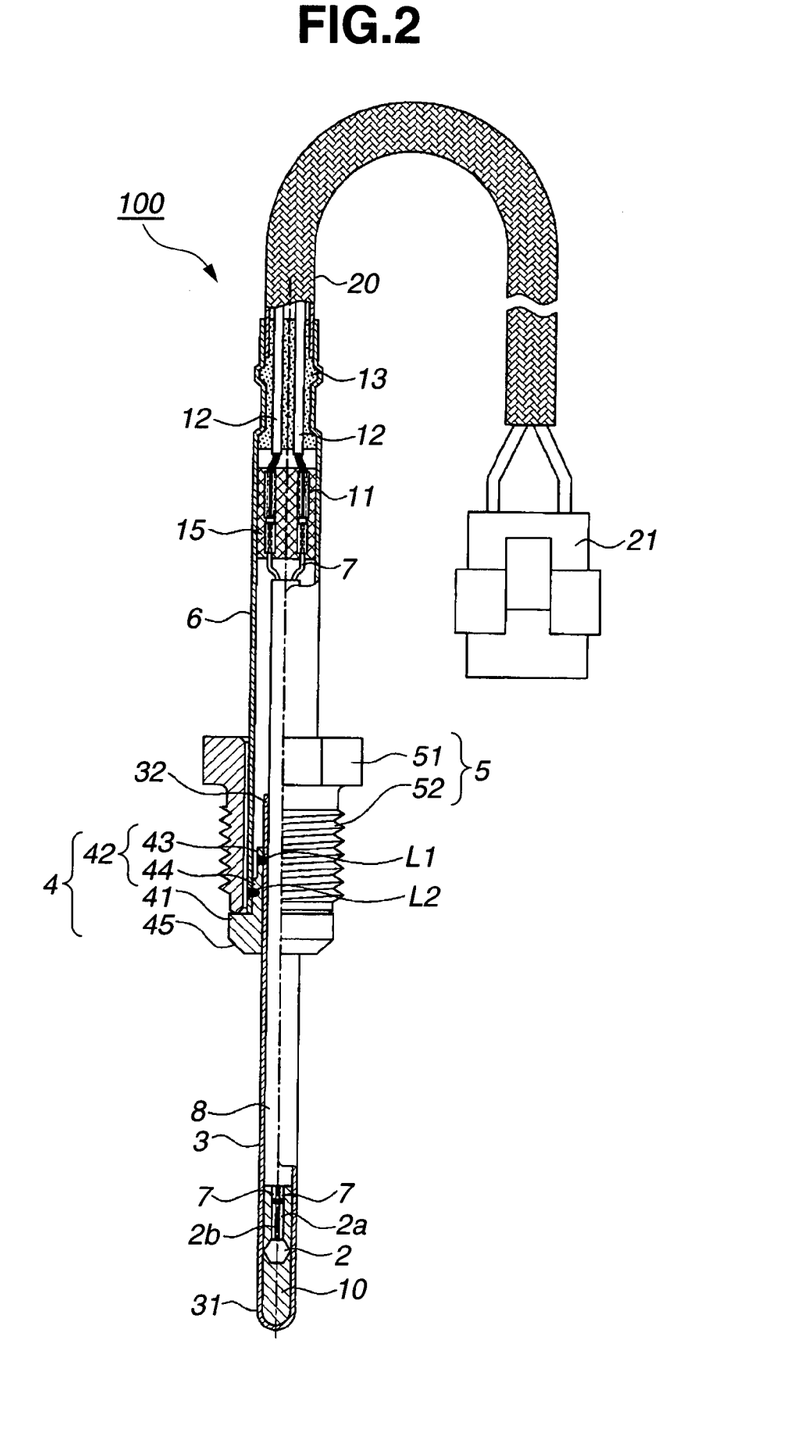
FIG. 2 is a partially sectional view of a temperature sensor using the thermistor element of FIG. 1.

According to one embodiment of the present invention, there is provided a temperature sensor 100 having a thermistor element 2 formed with a sintered electroconductive oxide 1 as shown in FIGS. 1 and 2.

The sintered electroconductive oxide 1 of the present embodiment contains a perovskite phase of perovskite-type crystal structure represented by the composition formula: $M1_aM2_bM3_cAl_dCr_eO_f$ where M1 is at least one of elements of group 3A other than La; M2 is at least one of elements of group 2A; M3 is at least one of elements of groups 4A, 5A, 6A, 7A and 8 other than Cr; and a, b, c, d, e and f satisfy the following conditional expressions:

$0.600 \leq a \leq 1.000$;

$0 \leq b \leq 0.400$;

$0.150 \leq c \leq 0.600$;

$0.400 \leq d \leq 0.800$;

$0 < e \leq 0.050$;

$0 < e/(c+e) \leq 0.18$; and $2.80 \leq f \leq 3.30$.

The perovskite phase of the sintered electroconductive oxide 1 has a perovskite type crystal structure $ABO_3$ where the A-site is $M1_aM2_b$; and the B-site is $M3_cAl_dCr_e$ and thus attains a composition represented by $(M1_aM2_b)(M3_cAl_dCr_e)O_3$. In this crystal structure, the elements M1 and M2 of the A-site can substitute each other because of similar ionic radii so that the A-site exists stably in such a substituted composition with less by-product of these elements. Similarly, the elements M3, Al and Cr of the B-site can substitute one another because of similar ionic radii so that the B-site exists stably in the substituted composition with less by-product of these elements. It is therefore possible to control the specific resistance and temperature gradient value (B-value) of the sintered electroconductive oxide 1 by changing the composition of the perovskite phase continuously over the wide composition range. There is a possibility of excess or lack of oxygen in the perovskite phase depending on the firing conditions (such as a firing atmosphere e.g. oxidation/reduction atmosphere and a firing temperature) for production of the sintered electroconductive oxide 1 and the degree of substitution of the constituent elements of the A-site and the B-site. The molar ratio between the oxygen atom and $(M1_aM2_b)$ and the molar ratio between the oxygen atom and $(M3_cAl_dCr_e)$ may not be truly 3:1 as long as the perovskite phase maintains its perovskite type crystal structure.

The sintered electroconductive oxide 1, in which a, b, c, d, e and f of the composition formula satisfy the above conditional expressions, shows a temperature gradient value (B-value) of 2000 to 3000 K in the temperature range of −40° C. to +900° C. and thereby enables proper temperature measurements over such a wide temperature range.

It is particularly preferable that a and b of the composition formula satisfy the following conditional expressions:

$0.600 \leq a < 1.000$; and $0 < b \leq 0.400$.

In the case of producing a plurality of samples of the sintered electroconductive oxide 1 (thermistor element 2) by setting a, b, c, d, e and f to given values, it is possible to reduce characteristics variations between individual samples of the sintered electroconductive oxide 1 (thermistor element 2) and between different firing lots of samples of the sintered electroconductive oxide 1 (thermistor element 2) when the sintered electroconductive oxide 1 contains as its essential constituent elements at least one element of group 3A other than La and at least one element of group 2A and, at the same time, when a and b of the composition formula satisfy the above conditional expressions.

More preferably, a, b, c, d, e and f of the composition formula satisfy the following conditional expressions:

$0.820 \leq a \leq 0.950$;

$0.050 \leq b \leq 0.180$;

$0.181 \leq c \leq 0.585$;

$0.410 \leq d \leq 0.790$;

$0.005 \leq e \leq 0.050$;

$0 < e/(c+e) \leq 0.18$; and $2.91 \leq f \leq 3.27$.

When a, b, c, d, e and f of the composition formula satisfy the above conditional expressions, it is possible to control the B-value of the sintered electroconductive oxide 1 to 2000 to 3000 K more assuredly in the temperature range of −40° C. to +900° C. In this case, it is also possible to further reduce characteristics variations between individual samples of the sintered electroconductive oxide 1 (thermistor element 2) and between different firing lots of samples of the sintered electroconductive oxide 1 (thermistor element 2) in the case of producing a plurality of samples of the sintered electroconductive oxide 1 (thermistor element 2) by setting a, b, c, d, e and f to given values.

Still more preferably, a, b, c, d, e and f of the composition formula satisfy the following conditional expressions in order to control the B-value of the sintered electroconductive oxide 1 appropriately and minimize characteristics variations between samples of the sintered electroconductive oxide 1:

$0.850 \leq a \leq 0.940$;

$0.060 \leq b \leq 0.150$;

$0.181 \leq c \leq 0.545$;

$0.450 \leq d \leq 0.780$;

$0.005 \leq e \leq 0.050$;

$0 < e/(c+e) \leq 0.18$; and $2.92 \leq f \leq 3.25$.

In addition, it is desirable in the sintered electroconductive oxide 1 to use one or more elements selected from Y, Nd and Yb as M1, one or more elements selected from Mg, Ca and Sr as M2 and one or more elements selected from Mn and Fe as M3.

The B-value of the sintered electroconductive oxide 1 can be stably controlled to within the above-mentioned range by using one or more elements of Y, Nd and Yb, one or more elements of Mg, Ca and Sr and one or more elements of Mn and Fe as M1, M2 and M3, respectively.

It is particularly desirable to use Y, Sr and Mn as the elements M1, M2 and M3, respectively, in the sintered electroconductive oxide 1.

The B-value of the sintered electroconductive oxide 1 can be more stably controlled to within the above-mentioned range by respectively using Y, Sr and Mn as the elements M1, M2 and M3.

Moreover, the sintered electroconductive oxide 1 preferably contains at least one metal oxide phase that shows lower electrical conductivity than that of the perovskite phase and has a crystal structure represented by the composition formula: $MeO_w$ where Me is at least one selected from the metal elements of the perovskite phase.

When the sintered electroconductive oxide 1 contains a metal oxide phase lower in electrical conductivity (in other words, high in insulation or high in specific resistance), it is possible to change the overall specific resistance of the sintered electroconductive oxide 1, while maintaining the B-value of the sintered electroconductive oxide 1, by appropriately adjusting the proportion of the metal oxide phase in the sintered electroconductive oxide 1. The thermistor element 2 using such a sintered electroconductive oxide 1, even if formed into any desired shape, shows a suitable electrical resistance in the temperature range of −40° C. to +900° C. The thermistor element 2 is thus able to carry out proper temperature measurements over this wide temperature range with the use of the sintered electroconductive oxide 1. The thermistor element 2 is also able to provide a simple temperature measurement circuit configuration and enable accurate temperature measurements as the resistance of the thermistor element 2 can be properly controlled by containing the metal oxide phase in the sintered electroconductive oxide 1.

As the metal element Me of the metal oxide phase $MeO_x$ is selected from the metal elements of the perovskite phase, there arises no possibility that an unexpected by-product is formed in the sintered oxide 1 where the perovskite phase and the metal oxide phase coexist and that the characteristics of the sintered oxide 1 is changed due to such by-product formation. If the metal element Me is not selected from the metal elements of the perovskite phase, the metal element Me may replace the constituent element of the perovskite phase so that the composition of the perovskite phase become different before and after the metal dissolution. The sintered oxide 1 is less prone to such compositional changes and is able to maintain its composition stably. Herein, it suffices that the metal oxide phase of the sintered oxide 1 shows lower electrical conductivity than that the perovskite phase and has a crystal structure represented by the composition formula: $MeO_x$ where Me is at least one selected from the metal elements of the perovskite phase. Specific examples of metal oxides of the metal oxide phase are single-metal oxides such as $Y_2O_3$, SrO, CaO, $MnO_2$, $Al_2O_3$ and $Cr_2O_3$ and complex oxides of plural metals such as Y—Al oxides (e.g. $YAlO_3$ and $Y_3Al_5O_{12}$) and Sr—Al oxides (e.g. $SrAl_2O_4$). These oxides may be contained in combination of two or more kinds thereof.

The average grain size of the sintered electroconductive oxide 1, which represents the size of crystal grains of the sintered oxide 1, is preferably in the range of 7 μm or smaller, more preferably 0.1 to 7 μm, still more preferably 0.1 to 3 μm. It is for the reason that the characteristics of the sintered oxide 1 and the characteristics of the thermistor element 2 with the sintered oxide 1 may become unstable when the average size of the crystal grains is too large.

It is further preferable to satisfy the following expression:

$$0.20 \leq SP/S \leq 0.80$$

where S is the area of a cross section of the sintered electroconductive oxide 1; and SP is the total cross section area of the perovskite phase appearing on the cross section of the sintered electroconductive oxide 1.

When the sintered electroconductive oxide 1 contains not only the perovskite phase but the metal oxide phase, both of the perovskite phase and the metal oxide phase appear on the cross section of the sintered oxide 1. It is possible to control the resistance of the sintered electroconductive oxide 1 appropriately by establishing the above relationship between the cross section area S of the sintered oxide 1 and the cross section area SP of the perovskite phase. By way of example, the lower limit of the proportion of the cross section area SP of the perovskite phase in the cross section area S of the sintered oxide 1 is set to 0.20 (20%). If the proportion of the cross section area SP of the perovskite phase, which is relatively high in electrical conductivity as compared to that of the metal oxide phase, is less than 20%, the sintered oxide 1 decreases in conductivity and becomes too high in specific resistance. It is difficult to use the sintered oxide 1 having such specific resistance in the thermistor element 2 of standard shape. Further, the upper limit of the proportion of the cross section area SP of the perovskite phase in the cross section area S of the sintered oxide 1 is set to 0.80 (80%). If the proportion of the cross section area SP of the perovskite phase exceeds 80%, the sintered oxide 1 shows a small increase in specific resistance due to a slight decrease in conductivity so that the effect of adding the metal oxide phase, which is lower in specific resistance than the perovskite phase, becomes little. It is herein noted that the proportion of the cross section area SP of the perovskite phase in the cross section area S of the sintered oxide 1 is substantially equal to a volume fraction of the perovskite phase in the sintered oxide 1.

Preferably, the metal oxide phase of the sintered electroconductive oxide 1 contains a complex oxide (an oxide of two or more kinds of metals).

In a high-temperature environment e.g. during the firing of the sintered oxide 1 or under a temperature condition of 900° C., it is unlikely that only one of two metal elements of the complex oxide migrates to the perovskite phase and replaces the constituent element of the perovskite phase as compared to the case that the metal element of the single-metal oxide migrates to the perovskite phase and replaces the constituent element of the perovskite phase. When the complex oxide is contained in the metal oxide phase of the sintered oxide 1, it is possible to prevent a compositional change in the perovskite phase under the high temperature environment for improvement in heat resistance.

It is particularly preferable that a and b of the composition formula satisfy the following conditional expressions and, at the same time, the complex oxide of the metal oxide phase is an oxide of the elements M1 and M2:

$$0.600 \leq a < 1.000; \text{ and}$$

$$0 \leq b \leq 0.400.$$

Both of the elements M1 and M2 are the A-site elements of the perovskite phase in the sintered oxide 1. In the high temperature environment e.g. during the firing of the sintered oxide 1 or under a temperature condition of 900° C., it is unlikely that only one of the elements M1 and M2 of the complex oxide migrates to A-site of the perovskite phase and replaces the A-site element of the perovskite phase as compared to the case that the metal element (M1 or M2) of the single-metal oxide migrates to A-site of the perovskite phase and replaces the A-site element of the perovskite phase. It is thus possible to further prevent a compositional change in the perovskite phase under the high temperature environment and improve the heat resistance of the sintered oxide 1 when a and b of the composition formula satisfy the above conditional expressions and the metal oxide phase of the sintered oxide 1 contains the complex oxide of the elements M1 and M2.

Specific examples of such a complex oxide are $SrY_2O_4$ and $SrY_4O_7$ when the perovskite phase is represented by (Y, Sr)(Mn, Al, Cr)$O_3$.

In this case, it is desirable for the sintered electroconductive oxide 1 to contain Y in the element M1, to contain Sr in the element M2 and contain a complex oxide of the composition formula: $SrY_2O_4$ in the metal oxide phase.

The heat resistance and high-temperature stability of the sintered oxide 1 can be increased when the metal oxide phase of the sintered electroconductive oxide 1 contains $SrY_2O_4$ as the complex oxide.

It is also particularly preferable that a and b of the composition formula satisfy the following conditional expressions and, at the same time, the metal oxide phase contains a complex oxide of at least either one of the elements M1 and M2 and at least either one of the element M3, Al and Cr:

$0.600 \leq a < 1.000$; and $0 < b \leq 0.400$.

It is possible to limit a compositional change in the perovskite phase when a and b of the composition formula satisfy the above conditions and the metal oxide phase of the sintered oxide 1 contains the complex oxide of the A-site element (M1, M2) and the B-site element (M3, Al, Cr) of the perovskite phase. Specific examples of such a complex oxide are $SrAl_2O_4$, $YAlO_3$ and $Y_3Al_5O_{12}$ when the perovskite phase is represented by (Y, Sr)(Mn, Al, Cr)$O_3$.

In this case, it is desirable for the sintered electroconductive oxide 1 to contain Sr in the element M2 and contain a complex oxide of the composition formula: $SrAl_2O_4$ in the metal oxide phase.

The heat resistance of the sintered oxide 1 can be increased advantageously when the perovskite phase contains Sr and the metal oxide phase contains $SrAl_2O_4$.

As shown in FIG. 1, the thermistor element 2 of the present embodiment includes a pair of electrode wires 2a and 2b having their respective one ends embedded in the sintered electroconductive oxide 1.

With the use of the above sintered electroconductive oxide 1, the thermistor element 2 shows a suitable temperature gradient value to enable temperature measurements over a wide temperature range of −40° C. to 900° C. Especially when the sintered oxide 1 contains not only the perovskite phase where a, b, c, d, e and f of the composition formula satisfy the above conditional expressions but the metal oxide phase lower in conductivity than the perovskite phase, the thermistor element 2 enables temperature measurements over a wide temperature range of −40° C. to 900° C. and suitably shows a resistance of 50 Ω to 500 kΩ in this temperature range.

Figure 4:
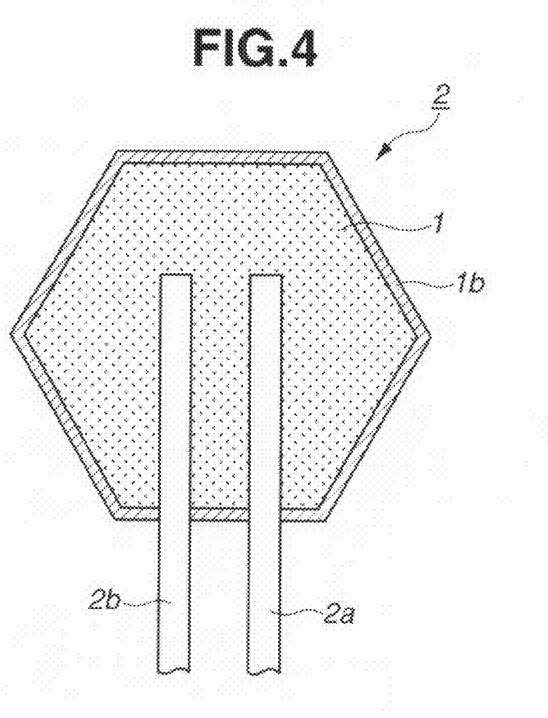
FIG. 4 is a partially sectional view of the thermistor element according to one exemplary embodiment of the present invention.

The thermistor element 2 may preferably include a reduction-resistant coating 1b covering the sintered electroconductive oxide 1 as shown in FIG. 4.

When the thermistor element 2 has such a reduction-resistant coating 1b on the sintered electroconductive oxide 1, the reduction-resistance coating 1b protects the sintered oxide 1 from reduction so that it is possible to maintain the resistance of the thermistor element 2 (sintered oxide 1) at a favorable value even if the thermistor element 2 is subjected to a reducing atmosphere.

As shown in FIG. 2, the temperature sensor 100 of the present embodiment is designed to detect the temperature of an exhaust gas in an automotive engine using as a temperature sensing element thermistor element 2 formed with the sintered electroconductive oxide 1 and is mounted for its use to a sensor mount portion of an automobile exhaust pipe in such a manner that the thermistor element is located in the exhaust pipe.

In the temperature sensor 100, a metal tube 3 is formed into a bottomed cylindrical shape along the direction of a sensor axis (hereinafter also referred to as "axial direction") and has a closed front end portion 31 (on the bottom side in FIG. 2) in which the thermistor element 2 is installed. Cement 10 is filled in the metal tube 3 around the thermistor element 2 so as to fix the thermistor element 2 in position. A rear end 32 of the metal tube 3 is open and press-fitted in a flange member 4.

The flange member 4 includes a cylindrical shell 42 extending in the axial direction and a flange 41 located on a front side (bottom side in FIG. 2) of the shell 42 and having a larger outer diameter than that of the shell 42 to protrude radially outwardly from the shell 42. The flange member 4 also includes a tapered seat surface 45 formed on a front end of the flange 41 to seal the mount portion of the exhaust pipe. The shell 42 has a two-step shape with a front shell portion 44 and a smaller-diameter rear shell portion 43.

The metal tube 3 is held securely in the flange member 4 by press-fitting the metal tube 3 in the flange member 4 and laser-welding an outer surface of the metal tube 3 at a location L1 throughout its circumference to the rear shell portion 43 of the flange member 4.

Further, a metal cover member 6 is airtightly joined to the front shell portion 44 of the flange member 4 by press-fitting the metal cover member 6 into the front shell portion 44 of the flange member 4 and laser-welding the metal cover member 6 at a location L2 throughout its circumference to the front shell portion 44 of the flange member 4. An attachment member 5 with a hexagonal nut 51 and a screw 52 is rotatably fixed around the flange member 4 and the metal cover member 6. In the present embodiment, the temperature sensor 100 is mounted on the exhaust pipe (not shown) by bringing the seat surface 45 on the flange 41 of the flange member 4 into contact with the mount portion of the exhaust pipe and screwing the nut 5 in the mount portion.

There is a sheath member 8 provided in the metal tube 3, the flange member 4 and the metal cover member 6 of the temperature sensor 100. The sheath member 8 has a metallic outer casing, a pair of conductive core wires 7 installed in the outer casing, an insulative powder material filled in the outer casing in such a manner as to establish electrical insulation between the outer casing and the core wires 7 and to hold the core wires 7 in position. The electrode wires 2a and 2b of the thermistor element 2 are connected by laser welding to the respective end portions of the core wires 7 protruding from the front end of the outer casing (downward in the drawing) within the metal tube 3. On the other hand, the respective end portions of the core wires 7 protruding rearward from the sheath member 8 are connected to a pair of lead wires 12 via crimp terminals 11. Insulating tubes 15 are arranged to provide electrical insulation between the core wires 7 and between the crimp terminals 11. The lead wires 12 pass through lead wire insertion holes of an elastic seal member 13, which is fitted in the rear end portion of the metal cover member 6, extend from inside to outside of the metal cover member 6, and then, are coupled to terminals of a connector 21 for connection to an external circuit (such as ECU, not shown). With this arrangement, the output of the thermistor element 2 is sent from the core wires 7 of the sheath member 8 to the external circuit through the lead wires 12 and the connector 21 so as to determine the temperature of the exhaust gas in the automotive engine. In order to protect the lead wires 12 from external force e.g. scattering stones, the lead wires 12 are covered with a glass braided tube 20. The glass braided tube 20 is crimped at a front end thereof into the metal cover member 6 together with the elastic seal member 13.

The metal tube 3 and the outer casing of the sheath member 8 have previously been heat treated so that the outer and inner surfaces of the metal tube 3 and the outer casing of the sheath member 8 become oxidized to form oxide films. This makes it possible to protect the metal tube 3 and the outer casing of the sheath member 8 from oxidation and to prevent the interior of the metal tube 3 from developing a reducing atmosphere even when the surroundings of the thermistor element 2 of the temperature sensor 100 reaches a high temperature. The thermistor element 2 is thus prevented from changing in resistance by reduction.

The temperature sensor 100 is capable of carrying out proper temperature measurements over a wide temperature range of −40° C. to 900° C. through the use of the thermistor element 2 formed with the sintered electroconductive oxide 1 as the temperature sensing element in the present embodiment. Further, the temperature measurement (resistance measurement) circuit configuration of the temperature sensor 100 is simplified for accurate temperature measurements.

EXAMPLES

The present invention will be described in more detail with reference to the following examples. It should be however noted that the following examples are only illustrative and not intended to limit the invention thereto.

An explanation will be first given of the production and performance evaluation of thermistor elements 2 using sintered electroconductive oxides 1 according to Examples 1 to 7 and thermistor elements using sintered electroconductive oxides according to Comparative Examples 1 and 2.

Examples 1-7

Raw powder materials of $Y_2O_3$, $SrCO_3$, $MnO_2$, $Al_2O_3$ and $Cr_2O_3$ (all commercially available at purity of 99% or greater) were weighed to attain a composition of the chemical formula (composition formula): $Y_aSr_bMn_cAl_dCr_eO_3$ by mole fractions a, b, c, d and e indicated in TABLE 1, followed by subjecting the raw powder materials to wet mixing and drying. The resultant powder material mixture was calcined at 1400° C. for 2 hours in the air so that the calcined powder material had an average grain size of 1 to 2 μm. Using ethanol as a solvent, the calcined powder material was subjected to wet blending/grinding by means of a resin pot and a high-purity $Al_2O_3$ ball.

The thus-obtained slurry was dried at 80° C. for 2 hours to yield a thermistor composition powder material. Subsequently, 100 parts by weight the thermistor composition powder material and 20 parts by weight a binder predominantly of polyvinyl butyral were mixed, dried and granulated with a 250-μm mesh screen.

The binder is not particularly restricted to the polyvinyl butyral. Any other binder such as polyvinyl alcohol or acrylic binder can alternatively be used. The blending amount of the binder is generally 5 to 20 parts by weight, preferably 10 to 20 parts by weight, with respect to the total amount of the calcined powder material. It is desirable to control the average grain size of the thermistor composition powder material to 2.0 μm or smaller in order for the composition powder material and the binder to be mixed uniformly.

The granulated powder material was subjected to die press forming (press pressure: 4500 kg/cm$^2$) to form a green compact of hexagonal plate shape (1.24 mm in thickness) with an electrode wire pair 2a, 2b of Pt—Rh alloy embedded at one end thereof in the green compact as shown in FIG. 1. The green compact was fired at 1500° C. for 2 hours in the air, thereby providing the thermistor element 2 with the sintered electroconductive oxide 1 according to each of Examples 1 to 7. The thermistor element 2 had a hexagonal shape with a side length of 1.15 mm, a thickness of 1.00 mm, a diameter φ of the electrode wires 2a and 2b of 0.3 mm, an electrode center distance of 0.74 mm (a gap of 0.44 mm) and an electrode insertion length of 1.10 mm.

The B-value (temperature gradient value) of the thermistor element 2 according to each of Examples 1 to 7 was next determined by the following procedure. The initial resistance value R(−40) of the thermistor element 2 was measured under the condition that the thermistor element 2 was left in an atmosphere of absolute temperature T(−40)=233 K (=−40° C.). After that, the initial resistance value R(900) of the thermistor element 2 was measured under the condition that the thermistor element 2 was left in an atmosphere of absolute temperature T(900)=1173 K (=900° C.). The B-value B(−40~900) of the thermistor element 2 was then calculated by the following expression.

$$B(-40\sim900)=\ln[R(900)/R(-40)]/[1/T(900)-1/T(-40)]$$

Further, the thermistor element 2 according to each of Examples 1 to 7 was subjected to repeated temperature changes in the air to evaluate the resistance change of the thermistor element 2 due to the repeated temperature changes. More specifically, the resistance value R1 (−40) of the thermistor element 2 was measured after the thermistor element 2 was cooled from room temperature (25° C.) to −40° C. at a temperature decrease rate of −80 deg/hr and left in an atmosphere of −40° C. for 2.5 hours. The resistance value R1(900) of the thermistor element was measured after the thermistor element 2 was heated to 900° C. at a temperature increase rate of +300 deg/hr and left in an atmosphere of 900° C. for 2 hours. The resistance value R2(−40) of the thermistor element was again measured after the thermistor element 2 was cooled to −40° C. at a temperature decrease rate of −80 deg/hr and left in an atmosphere of −40° C. for 2.5 hours. The resistance value R2(900) of the thermistor element 2 was then measured after the thermistor element 2 was heated to 900° C. at a temperature increase rate of +300 deg/hr and left in an atmosphere of 900° C. for 2 hours. Upon comparison between the resistance values R1(−40) and R2(−40) of the thermistor element 2 as measured at −40° C., the conversion value DT(−40) (in units of deg.) equivalent to the resistance change of the thermistor element 2 due to the repeated temperature changes was calculated by the following expression. Similarly, the conversion value DT(900) (in units of deg.) was calculated by the following expression upon comparison between the resistance values R1(900) and R2(900) of the thermistor element 2 as measured at 900° C. The larger one of the conversion values DT(−40) and DT(900) was selected as a conversion value DT(deg).

$$DT(-40)=[(B(-40\sim900)\times T(-40))/[\ln(R2(-40)/R1(-40))\times T(-40)+B(-40\sim900)]]-T(-40)$$

$$DT(900)=[(B(-40\sim900)\times T(900))/[\ln(R2(900)/R1(900))\times T(900)+B(-40\sim900)]]-T(900)$$

The thermistor element of Example 3 was built into a temperature sensor 100 and tested for its resistance change due to temperature changes. More specifically, the initial resistance values Rt(−40) and Rt(900) of the thermistor element 2 were measured at −40° C. and 900° C. in a state that the thermistor element 2 was built in the temperature sensor 100. The post heat treatment resistance values Rt'(−40) and Rt' (900) of the thermistor element 2 were measured at −40° C. and 900° C. in the same manner after heat treatment at 1050° C. for 50 hours in the air. Upon comparison between the initial resistance value Rt(−40) and the post heat treatment resistance value Rt'(−40) of the thermistor element 2 as measured at −40C., the conversion value CT(−40) (in units of deg.) equivalent to the resistance change of the thermistor element 2 due to the heat treatment was calculated by the following expression. Similarly, the conversion value CT(900) (in units of deg.) was calculated by the following expression upon comparison between the initial resistance value Rt(900) and the post heat treatment resistance value Rt'(900) of the thermistor element 2 as measured at 900° C. The larger one of the conversion values CT(−40) and CT(900) was selected as a conversion value CT(deg).

$$CT(-40)=[(B(-40\sim900)\times T(-40))/[\ln(Rt'(-40)/Rt(-40))\times T(-40)+B(-40\sim900)]]-T(-40)$$

$$CT(900)=[(B(-40\sim900)\times T(900))/[\ln(Rt'(900)/Rt(900))\times T(900)+B(-40\sim900)]]-T(900)$$

These measurement results are indicated in TABLE 1.

Comparative Examples 12

The thermistor elements using the sintered electroconductive oxides according to Comparative Examples 1 and 2 were produced and tested for their respective B-values (temperature gradient values) and conversion values DT(deg) in the same manner as in Examples 1 to 7. The thermistor element of Comparative example 2 was also built into a temperature sensor and tested for its conversion value CT(deg) in the same manner as above. The measurements results are indicated in TABLE 1.

As shown in TABLE 1, the thermistor elements 2 using the sintered electroconductive oxides 1 according to Examples 1 to 7, in which the values a, b, c, d, e and f of the composition formula: $Y_aSr_bMn_cAl_dCr_eO_f$ satisfied the following conditional expressions, had a relatively low B-value of B(−40~900)=2000 to 3000 K as compared to those of conventional thermistor elements. These thermistor elements 2 could therefore show suitable resistances to enable proper temperature measurements over the wide range from a low temperature of −40° C. to a high temperature of 900° C. by the use of the sintered electroconductive oxides 1.

$0.600 \leq a \leq 1.000$ (preferably, $0.600 \leq a \leq 1.000$)

$0 \leq b \leq 0.400$ (preferably, $0 < b \leq 0.400$)

$0.150 \leq c < 0.600$ $0.400 \leq d \leq 0.800$ $0 < e \leq 0.050$ $0 < e/(c+e) \leq 0.18$ $2.80 \leq f \leq 3.30$ It has been confirmed that the value f of the composition formula was within the range of f=2.80 to 3.30 based on the composition ratio of the elements Y, Sr, Mn, Al, Cr and O as measured by X-ray fluorescence analysis although not indicated in TABLE 1. The same applied to sintered electroconductive oxides 1 (thermistor elements 2) according to Examples 8 to 16 as described later.

As is seen from Comparative Examples 1 and 2, by contrast, the thermistor elements had a B-value B(−40~900) outside the range of 2000 to 3000 K as departing from the scope of the present invention. To be more specific, the B-value was larger than 3000 K in each of Comparative Example 1 in which the value d exceeded the range of the above conditional expression (d≦0.800) and Comparative Example 2 in which the value e/(c+e) exceeded the range of the above conditional expression (e/(c+e)≦0.18). The resistance changes of these thermistor elements would become too large so that it is difficult to allow proper resistance measurements and proper temperature measurements over the temperature range of −40° C. to 900° C. Depending on the composition of the sintered electroconductive oxide (e.g. when the value d indicative of the mole fraction of Al is below the range of the above conditional formula (d≧0.400)), there may be a case where the B-value becomes less than 2000 K although not

TABLE 1

| Example | Element | | | | | e/(c + e) | B-value B(−40~900) (K) | Conversion value CT (deg) | Conversion value DT (deg) |
| | Y a | Sr b | Mn c | Al d | Cr e | | | | |
| --- | --- | --- | --- | --- | --- | --- | --- | --- | --- |
| Example 1 | 0.850 | 0.150 | 0.252 | 0.720 | 0.028 | 0.10 | 2911 | — | ±0 |
| Example 2 | 0.850 | 0.150 | 0.288 | 0.680 | 0.032 | 0.10 | 2701 | — | ±0 |
| Example 3 | 0.940 | 0.060 | 0.209 | 0.780 | 0.011 | 0.05 | 2890 | +5 | ±0 |
| Example 4 | 0.900 | 0.100 | 0.285 | 0.700 | 0.015 | 0.05 | 2553 | — | ±0 |
| Example 5 | 0.900 | 0.100 | 0.380 | 0.600 | 0.020 | 0.05 | 2285 | — | ±0 |
| Example 6 | 0.900 | 0.100 | 0.475 | 0.500 | 0.025 | 0.05 | 2263 | — | ±0 |
| Example 7 | 0.940 | 0.060 | 0.199 | 0.760 | 0.041 | 0.17 | 2473 | — | ±0 |
| Comparative Example 1 | 0.940 | 0.060 | 0.158 | 0.833 | 0.009 | 0.05 | 3513 | — | ±0 |
| Comparative Example 2 | 0.900 | 0.100 | 0.160 | 0.800 | 0.040 | 0.20 | 3338 | +5 | ±0 | indicated as a comparative example. In this case, the resistance change of the thermistor element will become so small that it is possible to allow resistance measurements over the temperature range of −40° C. to 900° C. but difficult to make proper temperature measurements due to a deterioration in resistance measurement accuracy. It is herein noted that Comparative Example 2 of TABLE 2 corresponds to Example 20 of Patent Document 2.

The conversion value DT as determined by the above-mentioned method is one index of the resistance change characteristics relative to thermal history. Namely, it can be said that the sintered oxide 1 (thermistor element 2) has the characteristics of showing a small resistance change against its thermal history when the conversion value DT is within the range of ±10 deg. The conversion values DT of the thermistor elements 2 according to Examples 1 to 7 and of the thermistor elements according to Comparative Examples 1 and 2 were within such a standard range so that each of these thermistor elements would show a small resistance change against the thermal history and be practically usable without problems. In particular, the thermistor elements 2 of Examples 1 to 7 had a temperature-change conversion value DT of ±0 deg. It is thus apparent that the thermistor elements 2 would show favorable high-temperature stable characteristics by selection of the kinds and composition ratio of the constituent elements according to Examples 1 to 7.

The conversion value CT as determined by the above-mentioned method is also an index of the resistance change characteristics relative to thermal history, and it can be said that the sintered body 1 (thermistor element 2, temperature sensor 100) has the characteristics of showing a small resistance change against its thermal history when the temperature-change conversion value CT is within the range of ±10 deg. The conversion value CT of the temperature sensor 100 incorporating therein the thermistor element 2 with the sintered electroconductive oxide 1 according to Example 3 was ±5 deg and within such a standard range. It has been shown that the temperature sensor 100 of Example 3 would have high-temperature stable characteristics comparable with those of Comparative Example 2 and show a small resistance change against its thermal history.

Example 8

Using raw powder materials of $Nd_2O_3$, $SrCO_3$, $Fe_2O_3$, $Al_2O_3$ and $Cr_2O_3$ (all commercially available at purity of 99% or greater), the thermistor element 2 with the sintered electroconductive oxide 1 was produced to attain a composition of the chemical formula (composition formula): $Nd_aSr_bFe_cAl_dCr_eO_3$ by mole fractions a, b, c, d and e as indicated in TABLE 2. The thermistor element 2 was then tested for its B-value B(−40~900) and conversion value DT. The measurement results are indicated in TABLE 2. The method of production of the thermistor element 2 with the sintered electroconductive oxide 1 according to Example 8 was the same as above in Example 1 etc. except for different raw materials. The method of determination of the B-value B(−40~900) and conversion value DT was also the same as above.

TABLE 2

| | Element | | | | | | B-value | Conversion | Conversion |
|---|---|---|---|---|---|---|---|---|---|
| | Nd | Sr | Fe | Al | Cr | | B(−40~900) | value CT | value DT |
| Example | a | b | c | d | e | e/(c + e) | (K) | (deg) | (deg) |
| Example 8 | 0.940 | 0.060 | 0.262 | 0.730 | 0.008 | 0.03 | 2740 | — | −10 |

It has been shown in TABLE 2 that the thermistor element 2 using the sintered electroconductive oxide 1 according to Example 8 had a B-value B(−40~900) of 2000 to 3000 K, and more specifically B(−40~900)=2740 K. This thermistor element 2 could therefore allow proper temperature measurements over the wide range from a low temperature of −40° C. to a high temperature of 900° C. by the use of the sintered electroconductive oxide 1. Further, the conversion value DT of Example 8 was −10 deg and within the above standard range although the conversion value CT of Example 8 is not explicitly demonstrated. It is thus apparent that the sintered oxide 1 (thermistor element 2) of Example 8 would show a small resistance change against its thermal history and be practically usable without problems.

Examples 9-10

Using raw powder materials of $Y_2O_3$, $SrCO_3$, $CaCO_3$, $MnO_2$, $Al_2O_3$ and $Cr_2O_3$ (all commercially available at purity of 99% or greater), the thermistor elements 2 with the sintered electroconductive oxides 1 were produced to attain a composition of the chemical formula (composition formula): $Y_aSr_{b1}Ca_{b2}Mn_cAl_dCr_eO_3$ by mole fractions a, b (=b1+b2), c, d and e as indicated in TABLE 3. The thermistor elements 2 were then tested for their B-values B(−40~900) and conversion values DT. Further, the thermistor element 2 with the sintered electroconductive oxide 1 according to Example 9 was built into a temperature sensor 100 and tested for its temperature-change conversion value CT. The measurement results are indicated in TABLE 3. The method of production of the thermistor elements 2 with the sintered electroconductive oxides 1 according to Examples 9 and 10 was the same as above in Example 1 etc. except for different raw materials. The method of determination of the B-value B(−40~900) and conversion values DT and CT was also the same as above.

TABLE 3

| Example | Element | | | | | | e/(c + e) | B-value B(−40~900) (K) | Conversion value CT (deg) | Conversion value DT (deg) |
|---|---|---|---|---|---|---|---|---|---|---|
| | Y a | Sr b1 | Ca b2 | Mn c | Al d | Cr e | | | | |
| Example 9  | 0.920 | 0.040 | 0.040 | 0.190 | 0.800 | 0.010 | 0.05 | 2913 | +5 | ±0 |
| Example 10 | 0.920 | 0.053 | 0.027 | 0.190 | 0.800 | 0.010 | 0.05 | 2814 | — | ±0 |

It has been shown in TABLE 3 that the thermistor elements 2 using the sintered electroconductive oxides 1 according to Examples 9 and 10 had a B-value B(−40~900) of 2000 to 3000 K, and more specifically B(−40~900)=2913 K in Example 9 and B(−40~900)=2814 K in Example 10. These thermistor elements 2 could therefore allow proper temperature measurements over the wide range from a low temperature of −40° C. to a high temperature of 900° C. by the use of the sintered electroconductive oxides 1. Further, the conversion values of Example 9 were favorably DT=±0 deg and CT =+5 deg. It is thus apparent that the sintered oxide 1 (thermistor element 2) of Example 9 would have high-temperature stable characteristics comparable with those of Example 3. Although the conversion value CT of Example 10 is not explicitly demonstrated, the temperature change value DT of Example 10 was ±0 deg so that the sintered oxide 1 (thermistor element 2) of Example 10 would thus show a small resistance change against its thermal history and be practically usable without problems as in the case of Example 9.

Examples 11-13

Using raw powder materials of $Y_2O_3$, $SrCO_3$, $MgO$, $MnO_2$, $Al_2O_3$ and $Cr_2O_3$ (all commercially available at purity of 99% or greater), the thermistor elements 2 with the sintered electroconductive oxides 1 were produced to attain a composition of the chemical formula (composition formula): $Y_aSr_{b1}Mg_{b2}Mn_cAl_dCr_eO_3$ by mole fractions a, b(=b1+b2), c, d and e as indicated in TABLE 4. The thermistor elements 2 were then tested for their B-values B(−40~900) and temperature-change conversion values DT. The measurement results are indicated in TABLE 4. The method of production of the thermistor elements 2 with the sintered electroconductive oxides 1 according to Examples 11 to 13 was the same as above in Example 1 etc. except for different raw materials. The method of determination of the B-value B(−40~900) and conversion values DT was also the same as above.

It has been shown in TABLE 4 that the thermistor elements 2 using the sintered electroconductive oxides 1 according to Examples 11 to 13 had a B-value B(−40~900) of 2000 to 3000 K, and more specifically B(−40~900)=2950 K in Example 11, B(−40~900)=2920 K in Example 12 and B(−40~900)= 2688 K in Example 13. These thermistor elements 2 could therefore allow proper temperature measurements over the wide range from a low temperature of −40° C. to a high temperature of 900° C. by the use of the sintered electroconductive oxides 1. The conversion values were DT =+10 deg in Examples 11 and 12 and DT =+8 deg in Example 13 although the temperature-change conversion values CT of Examples 11 to 13 are not explicitly demonstrated. It is thus apparent that each of the sintered oxides 1(thermistor elements 2) of Examples 11 to 13 would show a small resistance change against its thermal history and be practically usable without problems.

Examples 14-16

Using raw powder materials of $Y_2O_3$, $Yb_2O_3$, $SrCO_3$, $MnO_2$, $Al_2O_3$ and $Cr_2O_3$ (all commercially available at purity of 99% or greater), the thermistor elements 2 with the sintered electroconductive oxides 1 were produced to attain a composition of the chemical formula (composition formula): $Y_{a1}Yb_{a2}Sr_bMn_cAl_dCr_eO_3$ by mole fractions a (=a1+a2), b, c, d and e as indicated in TABLE 5. The thermistor elements 2 were then tested for their B-values B(−40~900) and temperature-change conversion values DT. The measurement results are indicated in TABLE 5. The method of production of the thermistor elements 2 with the sintered electroconductive oxides 1 according to Examples 14 to 16 was the same as above in Example 1 etc. except for different raw materials. The method of determination of the B-values B(−40~900) and conversion values DT was also the same as above.

TABLE 4

| Example | Element | | | | | | e/(c + e) | B-value B(−40~900) (K) | Conversion value CT (deg) | Conversion value DT (deg) |
|---|---|---|---|---|---|---|---|---|---|---|
| | Y a | Sr b1 | Mg b2 | Mn c | Al d | Cr e | | | | |
| Example 11 | 0.850 | 0.050 | 0.100 | 0.266 | 0.720 | 0.014 | 0.05 | 2950 | — | +10 |
| Example 12 | 0.850 | 0.050 | 0.100 | 0.247 | 0.740 | 0.013 | 0.05 | 2920 | — | +10 |
| Example 13 | 0.900 | 0.075 | 0.025 | 0.209 | 0.780 | 0.011 | 0.05 | 2688 | — | +8 |

TABLE 5

| Example | Element | | | | | | e/(c + e) | B-value B(-40~900) (K) | Conversion value CT (deg) | Conversion value DT (deg) |
| --- | --- | --- | --- | --- | --- | --- | --- | --- | --- | --- |
| | Y a1 | Yb a2 | Sr b | Mn c | Al d | Cr e | | | | |
| Example 14 | 0.800 | 0.050 | 0.150 | 0.285 | 0.700 | 0.015 | 0.05 | 2734 | — | ±0 |
| Example 15 | 0.700 | 0.150 | 0.150 | 0.285 | 0.700 | 0.015 | 0.05 | 2401 | — | +5 |
| Example 16 | 0.700 | 0.150 | 0.150 | 0.209 | 0.780 | 0.011 | 0.05 | 2438 | — | +8 |

It has been shown in TABLE 5 that the thermistor elements 2 using the sintered electroconductive oxides 1 according to Examples 14 to 16 had a B-value B(-40~900) of 2000 to 3000 K, and more specifically B(-40~900)=2734 K in Example 14, B(-40~900)=2401 K in Example 15 and B(-40~900)=2438 K in Example 16. These thermistor elements 2 could therefore allow proper temperature measurements over the wide range from a low temperature of -40° C. to a high temperature of 900° C. by the use of the sintered electroconductive oxides 1. The conversion values were DT =+0 deg in Example 14, DT =+5 deg in Example 15 and DT =+8 deg in Example 16 although the conversion values CT of Examples 14 to 16 are not explicitly demonstrated. It is thus apparent that each of the sintered oxides 1 (thermistor elements 2) of Examples 14 to 16 would show a small resistance change against its thermal history and be practically usable without problems.

Examples 17-34

A calcined powder material for a perovskite phase was first prepared as follows. Raw powders of $Y_2O_3$, $Nd_2O_3$, $Yb_2O_3$, $SrCO_3$, $MgO$, $CaCO_3$, $MnO_2$, $Fe_2O_3$, $Al_2O_3$ and $Cr_2O_3$ (all commercially available at purity of 99% or greater) were weighed to attain a composition of the chemical formula (composition formula): $M1_aM2_bM3_cAl_dCr_eO_3$ by elements M1, M2 and M3 and by mole fractions a, b, c, d and e indicated in TABLE 6. These raw powders were subjected to wet mixing and drying. The calcined perovskite-phase powder material was then provided with an average grain size of 1 to 2 μm by calcining the raw powder mixture at 1400° C. for 2 hours in the air.

In each of Examples 17 to 31, 33 and 34, a calcined powder material for a metal oxide phase was prepared as follows. Raw powders of $SrCO_3$ and $Al_2O_3$ (all commercially available at purity of 99% or greater) were weighed to attain a composition: $SrAl_2O_4$, followed by subjecting the raw powders to wet mixing and drying. The resultant raw powder mixture was calcined at 1200° C. for 2 hours in the air to provide the calcined metal-oxide-phase powder material with an average grain size of 1 to 2 μm. For reduction-resistant coating formation, dip coating slurry was provided separately by kneading a binder and a solvent with the calcined powder material of $SrAl_2O_4$ in Example 33.

In Example 32, a calcined powder material for a metal oxide phase was prepared as follows. Raw powders of $Y_2O_3$ and $SrCO_3$ (all commercially available at purity of 99% or greater) were weighed to attain a composition $SrY_2O_4$, followed by subjecting the raw powders to wet mixing and drying. The resultant raw powder mixture was calcined at 1200° C. for 2 hours in the air to provide the calcined metal-oxide-phase powder material with an average grain size of 1 to 2 μm.

The calcined perovskite-phase powder material and the calcined metal-oxide-phase powder material were weighed and subjected to wet grinding using ethanol as a solvent by means of a resin pot and a high-purity $Al_2O_3$ ball.

The thus-obtained slurry was dried at 80° C. for 2 hours to yield a thermistor composition powder material. Subsequently, 100 parts by weight the thermistor composition powder material and 20 parts by weight a binder predominantly of polyvinyl butyral were mixed, dried and granulated with a 250-μm mesh screen.

The binder is not particularly restricted to the polyvinyl butyral. Any other binder such as polyvinyl alcohol or acrylic binder can alternatively be used. The blending amount of the binder is generally 5 to 20 parts by weight, preferably 10 to 20 parts by weight, with respect to the total amount of the calcined powder material. It is desirable to control the average grain size of the thermistor composition powder material to 2.0 μm or smaller in order for the composition powder material and the binder to be mixed uniformly.

In each of Examples 17 to 32 and 34, the granulated powder material was subjected to die press forming (press pressure: 4500 kg/cm²) to form a green compact of hexagonal plate shape (1.24 mm in thickness) with an electrode wire pair 2a, 2b of Pt—Rh alloy embedded at one end thereof in the green compact as shown in FIG. 1. The green compact was fired at 1500° C. for 2 hours in the air, thereby providing a thermistor element 2 with a sintered electroconductive oxide 1. The thermistor element 2 had a hexagonal shape with a side length of 1.15 mm, a thickness of 1.00 mm, a diameter φ of the electrode wires 2a and 2b of 0.3 mm, an electrode center distance of 0.74 mm (a gap of 0.44 mm) and an electrode insertion length of 1.10 mm as in the case of the above-mentioned examples.

In Example 33, the granulated powder material was subjected to die press forming (press pressure: 4500 kg/cm²) to form a green compact of hexagonal plate shape (1.24 mm in thickness) with an electrode wire pair 2a, 2b of Pt—Rh alloy embedded at one end thereof in the green compact, as shown in FIGS. 1 and 4, followed by immersing the green compact in the dip coating slurry, taking out the green compact and drying to coat a surface of the green compact with the slurry. The slurry-coated green compact was fired at 1500° C. for 2 hours in the air, thereby providing a thermistor element 2 with a sintered electroconductive oxide 1 covered densely by a reduction-resistant coating 1b of $SrAl_2O_4$ as shown in FIG. 4.

The B-values (temperature gradient values) of the thermistor elements 2 of Examples 17 to 34 were next determined in the same manner as in the above-mentioned examples.

Further, the thermistor elements 2 of Examples 17 to 34 were tested for their conversion values DT(deg) to evaluate the resistance changes of the thermistor elements 2 due to repeated temperature changes in the same manner as in the above-mentioned examples.

Each of the thermistor elements 2 of Examples 17, 18, 19, 22 and 33 was also built into a temperature sensor 100 and tested for its conversion value CT(deg) to evaluate the resistance variation of the thermistor element 2 due to temperature changes in the same manner as in the above-mentioned examples. These measurement results are indicated in TABLE 6.

Comparative Example 3

A thermistor element using a sintered electroconductive oxide according to Comparative Example 3 was produced and tested for its B-value (temperature gradient value) and conversion value DT (deg) in the same manner as in Examples 17 to 31 and 34. The thermistor element of Comparative Example 3 was also built into a temperature sensor and tested for its conversion value CT (deg) in the same manner as above. The measurement results are indicated in TABLE 6.

Figure 3:
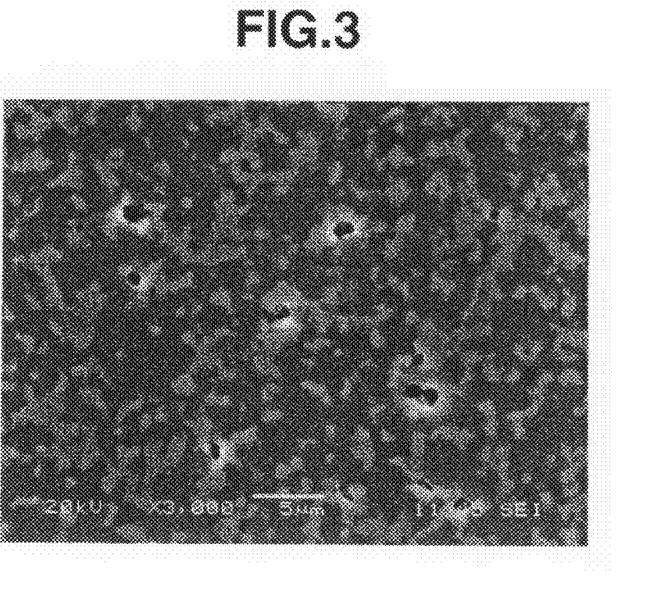
FIG. 3 is a scanning electron microscopic (SEM) picture showing one example of cross-sectional structure of a sintered electroconductive oxide according to one exemplary embodiment of the present invention.

Furthermore, the surface area fraction SP/S of the sintered oxide 1 of Example 22 was determined as follows by taking a picture of a cross-sectional structure of the sintered oxide 1 of Example 22. The sintered oxide 1 was embedded in a resin and subjected to buffing using 3-μm diamond paste to provide a test sample with a buffed cross section. A picture of the cross section of the test sample was taken using a scanning electron microscope (available under the trade name of "JSM-6460LA" from JEOL Ltd.). The picture of the cross section of the sintered oxide 1 according to Example 22 is indicated in FIG. 3. Herein, white, dark gray and black areas of the picture were determined by EDS chemical composition analysis to be a perovskite phase, a metal oxide phase (more specifically, $SrAl_2O_4$) and pores, respectively. A field of view of 40 μm×30 μm in the taken picture was analyzed by means of an image analysis device, thereby determining the proportion (surface area fraction) SP/S of the cross sectional area SP of the perovskite phase to the field of view (cross sectional area S).

When a sintered body is provided with multiple phases, the surface area fraction of one specific phase in any given cross section of the sintered oxide is equivalent to the volume fraction of such one specific phase in the sintered oxide. Namely, the surface area fraction SP/S is equivalent to the volume fraction of the perovskite phase in the sintered oxide. Apart from the pores, the sintered body 1 had two phases: perovskite phase and metal oxide phase as shown in FIG. 3 so that the surface area fraction SP/S was substantially equivalent to the surface or volume ratio between the perovskite phase and the metal oxide phase.

TABLE 6

| | Element M1 a | Element M2 b | Element c c | Element d (Al) | Element e (Cr) | e/(c + e) | Element Name M1 | Element Name M2 | Element Name M3 |
|---|---|---|---|---|---|---|---|---|---|
| Example 17 | 0.900 | 0.100 | 0.285 | 0.700 | 0.015 | 0.05 | Y | Sr | Mn |
| Example 18 | 0.900 | 0.100 | 0.285 | 0.700 | 0.015 | 0.05 | Y | Sr | Mn |
| Example 19 | 0.900 | 0.100 | 0.285 | 0.700 | 0.015 | 0.05 | Y | Sr | Mn |
| Example 20 | 0.900 | 0.100 | 0.380 | 0.600 | 0.020 | 0.05 | Y | Sr | Mn |
| Example 21 | 0.900 | 0.100 | 0.475 | 0.500 | 0.025 | 0.05 | Y | Sr | Mn |
| Example 22 | 0.900 | 0.100 | 0.333 | 0.650 | 0.018 | 0.05 | Y | Sr | Mn |
| Example 23 | 0.900 | 0.100 | 0.285 | 0.700 | 0.015 | 0.05 | Y | Sr | Mn |
| Example 24 | 0.900 | 0.100 | 0.378 | 0.580 | 0.042 | 0.10 | Nd | Sr | Mn |
| Example 25 | 0.940 | 0.060 | 0.388 | 0.600 | 0.012 | 0.03 | Nd | Sr | Mn |
| Example 26 | 0.700 | 0.300 | 0.190 | 0.800 | 0.010 | 0.05 | Y 0.5 Yb 0.5 | Sr | Mn |
| Example 27 | 0.940 | 0.060 | 0.190 | 0.800 | 0.010 | 0.05 | Y 0.9 Yb 0.1 | Sr | Mn |
| Example 28 | 0.850 | 0.150 | 0.285 | 0.700 | 0.015 | 0.05 | Y | Sr 0.33 Mg 0.67 | Mn |
| Example 29 | 0.900 | 0.100 | 0.209 | 0.780 | 0.011 | 0.05 | Y | Sr 0.75 Ca 0.25 | Mn |
| Example 30 | 0.900 | 0.100 | 0.209 | 0.780 | 0.011 | 0.05 | Y | Sr 0.5 Ca 0.5 | Mn |
| Example 31 | 0.850 | 0.150 | 0.247 | 0.725 | 0.028 | 0.10 | Y | Sr | Fe |
| Example 32 | 0.900 | 0.100 | 0.333 | 0.650 | 0.018 | 0.05 | Y | Sr | Mn |
| Example 33 | 0.900 | 0.100 | 0.333 | 0.650 | 0.018 | 0.05 | Y | Sr | Mn |
| Example 34 | 1.000 | 0.000 | 0.475 | 0.500 | 0.025 | 0.05 | Y | — | Mn |
| Comparative Example 3 | 0.900 | 0.100 | 0.950 | 0.000 | 0.050 | 0.05 | Y | Sr | Mn |

| | Metal oxide phase | Surface area fraction SP/S (%) | Reduction resistant coating | Initial Resistance Rs(−40) (kΩ) | Initial Resistance Rs(900) (kΩ) | B-value B(−40~900) (K) | Conversion value CT (deg) | Conversion value DT (deg) |
|---|---|---|---|---|---|---|---|---|
| Example 17 | SrAl2O4 | 31 | — | 423 | 0.088 | 2465 | +5 | +1 |
| Example 18 | SrAl2O4 | 35 | — | 386 | 0.074 | 2489 | +3 | ±0 |
| Example 19 | SrAl2O4 | 37 | — | 498 | 0.059 | 2629 | +3 | −1 |
| Example 20 | SrAl2O4 | 24 | — | 359 | 0.121 | 2325 | — | −2 |
| Example 21 | SrAl2O4 | 24 | — | 170 | 0.069 | 2271 | — | −1 |
| Example 22 | SrAl2O4 | 32 | — | 211 | 0.063 | 2360 | +3 | −1 |
| Example 23 | SrAl2O4 | 16 | — | 41400 | 5.92 | 2574 | — | −10 |
| Example 24 | SrAl2O4 | 50 | — | 493 | 0.050 | 2674 | — | −1 |
| Example 25 | SrAl2O4 | 50 | — | 474 | 0.065 | 2586 | — | +10 |
| Example 26 | SrAl2O4 | 73 | — | 356 | 0.071 | 2477 | — | +5 |
| Example 27 | SrAl2O4 | 78 | — | 996 | 0.065 | 2802 | — | ±0 |
| Example 28 | SrAl2O4 | 77 | — | 990 | 0.05 | 2877 | — | +2 |
| Example 29 | SrAl2O4 | 80 | — | 611 | 0.061 | 2678 | — | +9 |
| Example 30 | SrAl2O4 | 72 | — | 435 | 0.075 | 2520 | — | +8 |
| Example 31 | SrAl2O4 | 86 | — | 1334 | 0.075 | 2845 | — | −10 |

TABLE 6-continued

| | | | | | | | | |
|---|---|---|---|---|---|---|---|---|
| Example 32 | SrY2O4 | 32 | — | 400 | 0.065 | 2537 | — | ±0 |
| Example 33 | SrAl2O4 | 32 | SrAl2O4 | 189 | 0.058 | 2349 | −1 | ±0 |
| Example 34 | SrAl2O4 | 24 | — | 1610 | 0.701 | 2252 | — | −3 |
| Comparative Example 3 | SrAl2O4 | 17 | — | 14 | 0.009 | 2137 | — | −1 |

As shown in TABLE 6, the thermistor element 2 using the sintered electroconductive oxide 1, formed of the perovskite phase in which the values a, b, c, d, e and f of the composition formula $Y_aSr_bMn_cAl_dCr_eO_f$ satisfied the following conditions and the metal oxide phase ($SrAl_2O_4$) lower in electrical conductivity than the perovskite phase according to each of Examples 17 to 23 and 34, had a relatively low B-value of B(−40~900)=2000 to 3000 K as compared to those of conventional thermistor elements. It is noted that the constituent elements were M1=Y, M2=Sr and M3=Mn in TABLE 6. In Example 34, the perovskite phase did not contain M2 as shown in TABLE 6.

$$0.600 \leq a \leq 1.000$$

$$0 \leq b \leq 0.400$$

$$0.150 \leq c < 0.600$$

$$0.400 \leq d \leq 0.800$$

$$0 < e \leq 0.050$$

$$0 < e/(c+e) \leq 0.18$$

$$2.80 \leq f \leq 3.30$$

Although not indicated in TABLE 6, it has been confirmed that the value f of the composition formula was within the range of f=2.80 to 3.30 based on the composition ratio of the elements Y, Sr, Mn, Al, Cr and O as measured by X-ray fluorescence analysis, the presence or not of the crystal phase(s) as identified by powder X-ray diffraction analysis and the surface area fraction as determined by the above-mentioned method. To be more specific, the number f of O in the perovskite phase was calculated by specifying the existence ratio between the perovskite phase and the metal oxide phase ($SrAl_2O_4$), dividing the respective metal elements among the perovskite phase and the metal oxide phase, and then, determining the number of O in the metal oxide phase on the assumption that the number of O in the metal oxide phase ($SrAl_2O_4$) was four (i.e. there was no lack of oxygen in $SrAl_2O_4$).

In each of Examples 17 to 23 and 34, the sintered oxide 1 contained not only the perovskite phase but the metal oxide phase ($SrAl_2O_4$) lower in electrical conductivity than the perovskite phase so that the thermistor element 2 had a larger resistance e.g. initial resistance value Rs(−40), Rs(900) while maintaining its B-value. The resistance value of the thermistor element 2 was thus controlled appropriately depending on the quantity ratio between the perovskite phase and the metal oxide phase. For example, the sintered oxides 1 of Examples 17, 18 and 19, in which the low-conductivity metal oxide phase ($SrAl_2O_4$) was contained to control the surface area fraction of the perovskite phase to 30 to 40%, had an increase in resistance with increase in the proportion of the metal oxide phase (with decrease in the proportion of the perovskite phase). To be more specific, the initial resistance values were Rs(−40)=423 kΩ and Rs(900)=0.088 kΩ in Example 17. The sintered oxide 1 of Example 23, in which the low-conductive metal oxide phase was contained in a large amount to control the surface area fraction of the perovskite phase to about 16%, has a further increase in resistance. In Example 23, the initial resistance values were Rs(−40)=41400 kΩ and Rs(900)=5.92 kΩ. It has been thus shown that the resistance of the thermistor element 2 could be controlled to such a suitable value for resistance measurements by adjusting the surface area fraction of the perovskite phase appropriately.

The thermistor elements 2 using the sintered electroconductive oxides 1 according to Examples 24 and 25 in which the element M1 was Nd and Examples 26 and 27 in which the element M1 was Y and Yb, in contrast to Examples 17 to 23 in which the element M1 was Y, had a relatively low B-value of B(−40~900)=2000 to 3000 K as compared to those of conventional thermistor elements as shown in TABLE 6. Further, the resistance value of the thermistor element 2 was controlled appropriately depending on the quantity ratio between the perovskite phase and the metal oxide phase ($SrAl_2O_4$ in these examples) as in the case of Examples 17 to 23 and 34.

The thermistor elements 2 using the sintered electroconductive oxides 1 according to Examples 28, 29 and 30 in which the element M2 was Sr and Mg, or Sr and Ca, in contrast to Examples 17 to 23 in which the element M2 was Sr, also had a relatively low B-value of B(−40~900)=2000 to 3000 K as compared to those of conventional thermistor elements as shown in TABLE 6. Further, the resistance value of the thermistor element 2 was controlled appropriately depending on the quantity ratio between the perovskite phase and the metal oxide phase ($SrAl_2O_4$ in these examples) as in the case of Examples 17 to 23. The same applied to Example 31 in which the element M3 was Fe in contrast to Examples 17 to 23 in which the element M3 was Mn.

Furthermore, the thermistor element 2 using the sintered electroconductive oxide 1 according to Example 32 in which the metal oxide phase was $SrY_2O_4$, in contrast to Examples 17 to 23 in which the metal oxide phase was $SrAl_2O_4$, had a relatively low B-value of B(−40~900)=2000 to 3000 K as compared to those of conventional thermistor elements as shown in TABLE 6. The resistance value of the thermistor element 2 was also controlled appropriately depending on the quantity ratio between the perovskite phase and the metal oxide phase ($SrY_2O_4$ in this example).

The thermistor element 2 provided with the reduction-resistant coating 1b according to Example 33 had B-value and resistance value maintained within the suitable ranges. In Example 33, the thermistor element 2, when built into the temperature sensor 100, could also maintain its resistance value stably by protecting the sintered oxide 1 from reduction by virtue of the reduction-resistant coating 1b even in the case of the thermistor element 2 being placed in a reducing atmosphere by breakage of oxide films formed on the metal tube 3 and the outer casing of the sheath member 8 for some reason or by oxidation of the metal tube 3 and the outer casing of the sheath member 8 due to oxide film deficiency.

In the sintered oxide of Comparative Example 3, d=0, i.e., the perovskite phase did not contain Al. As a result, the thermistor element of Comparative Example 3 had a favorable B-value (B(-40~900)=2137 K) but showed an initial resistance of Rs(-40)=14 kΩ and Rs(900)=0.009 kΩ even though the metal oxide phase was contained in a large amount to control the surface area fraction of the perovskite phase to about 17%. It is for the reason that the perovskite phase was too high in conductivity (low in specific resistance) to control the resistance of the thermistor element to a sufficiently high value by the presence of a large amount of metal oxide phase. In this way, the sintered oxide could not show a suitable B-value and specific resistance (equivalently, thermistor resistance) when a, b, c, d, e and f of the composition formula were out of the ranges of the above conditional expressions in the perovskite phase of the sintered oxide.

As described above, the thermistor elements 2 using the sintered electroconductive oxides 1 according to Examples 17 to 34 had a B-value of 2000 to 3000 K suitable for resistance measurements over the wide range from a low temperature of -40° C. to a high temperature of 900° C. The resistance of the thermistor element 2 was controlled to such a suitable value for resistance measurements over the wide range from a low temperature of -40° C. to a high temperature of 900° C., by adjusting the proportion of the metal oxide phase in the sintered oxide 1 i.e. the surface area fraction of the perovskite phase appropriately according to the thermistor shape and electrode wire gap etc. The thermistor elements 2 of Examples 17 to 34 could therefore allow proper temperature measurements over the wide range from a low temperature of -40° C. to a high temperature of 900° C.

The conversion value DT is one index of the resistance change characteristics relative to thermal history, and it can be said that the sintered oxide 1 (thermistor element 2) has the characteristics of showing a small resistance change against its thermal history when the conversion value DT is within the range of ±10 deg. The conversion values DT of the thermistor elements 2 according to Examples 17 to 34 were ±10 deg and within such a standard range. It is thus apparent that each of the thermistor elements 2 of Examples 17 to 34 would show a small resistance change against the thermal history and be practically usable without problems.

The conversion value CT is also an index of the resistance change characteristics relative to thermal history, and it can be said that the sintered oxide 1 (thermistor element 2, temperature sensor 100) has the characteristics of showing a small resistance change against its thermal history when the conversion value CT is within the range of ±10 deg. The temperature sensor 100 incorporating therein the thermistor element 2 with the sintered electroconductive oxide 1 according to each of Examples 17, 18, 19, 22 and 33 had a favorable conversion value CT within the range of ±10 deg. It is thus apparent to show a small resistance change against its thermal history and good high-temperature stable characteristics. In particular, the sintered oxides 1 (thermistor elements 2, temperature sensors 100) of Examples 17, 19, 22 and 33 had a conversion value CT of ±3 deg and would show small resistance changes against their thermal histories as well as excellent high-temperature stable characteristics.

Although the present invention has been described with reference to the above-specific embodiments of the invention, the invention is not limited to the these exemplary embodiments. Various modification and variation of the embodiments described above will occur to those skilled in the art in light of the above teaching.

For example, the powders of the compounds of the respective constituent elements as indicated in the above examples are usable as raw powders for production of the sintered electroconductive oxide 1 (thermistor element 2). Any other compounds such as oxide, carbonate, hydroxide and nitrate are also usable. In particular, oxide and carbonate are preferred.

The sintered electroconductive oxide 1 may contain any other element or elements such as Na, K, Ga, Si, C, Cl and S on condition that the characteristics required of the sintered electroconductive oxide 1, the thermistor element 2 or the temperature sensor 100 such as the sinterability, B-value and high-temperature stability of the sintered electroconductive oxide 1 do not deteriorate.

The invention claimed is:

1. A sintered electroconductive oxide containing a perovskite phase of perovskite-type crystal structure represented by the composition formula:

$M1_a M2_b M3_c Al_d Cr_e O_f$ where M1 is at least one of elements of group 3A other than La;

M2 is at least one of elements of group 2A; M3 is at least one of elements of groups 4A, 5A, 6A, 7A and 8 other than Cr; and a, b, c, d, e and f satisfy the following conditional expressions:

$0.600 \leq a \leq 1.000$;

$0 \leq b \leq 0.400$;

$0.150 \leq c < 0.600$;

$0.400 \leq d \leq 0.800$;

$0 \leq e \leq 0.050$;

$0 < e/(c+e) \leq 0.18$; and $2.80 \leq f \leq 3.30$.

2. The sintered electroconductive oxide according to claim 1, wherein a and b satisfy the following conditional expressions:

$0.600 \leq a < 1.000$; and $0 \leq b \leq 0.400$.

3. The sintered electroconductive oxide according to claim 2, wherein a, b, c, d, e and f satisfy the following conditional expressions:

$0.820 \leq a \leq 0.950$;

$0.050 \leq b \leq 0.180$;

$0.181 \leq c \leq 0.585$;

$0.410 \leq d \leq 0.790$;

$0.005 \leq e \leq 0.050$;

$0 < e/(c+e) \leq 0.18$; and $2.91 \leq f \leq 3.27$.

4. The sintered electroconductive oxide according to claim 2, wherein M1 is one or more elements selected from Y, Nd, Yb; M2 is one or more elements selected from Mg, Ca and Sr; and M3 is one or more elements selected from Mn and Fe.

5. The sintered electroconductive oxide according to claim 4, wherein M1 is Y; M2 is Sr; and M3 is Mn.

6. The sintered electroconductive oxide according to claim 1, further having at least one metal oxide phase being lower in electrical conductivity than the perovskite phase and having a crystal structure represented by the composition formula: $MeO_x$ where Me is at least one selected from the metal elements of the perovskite phase.

7. The sintered electroconductive oxide according to claim 6, satisfying the following expression: $0.20 \leq SP/S \leq 0.80$ where S is the area of a cross section of the sintered electroconductive oxide; and SP is the total cross section area of the perovskite phase appearing on the cross section of the sintered electroconductive oxide.

8. The sintered electroconductive oxide according to claim 6, wherein the metal oxide phase contains a complex oxide.

9. The sintered electroconductive oxide according to claim 8, wherein a and b satisfy the following conditional expressions; and the metal oxide phase contains a complex oxide of the elements M1 and M2:

$0.600 \leq a < 1.000$; and $0 \leq b \leq 0.400$.

10. The sintered electroconductive oxide according to claim 9, wherein the element M1 contains Y; the element M2 contains Sr; and the metal oxide phase contains a complex oxide represented by the composition formula: $SrY_2O_4$.

11. The sintered electroconductive oxide according to claim 8, wherein a and b satisfy the following conditional expressions; and the metal oxide phase contains a complex oxide of at least either one of the elements M1 and M2 and at least one of either one of the element M3, Al and Cr:

$0.600 \leq a < 1.000$; and $0 < b \leq 0.400$.

12. The sintered electroconductive oxide according to claim 11, wherein the element M2 contains Sr; and the metal oxide phase contains a complex oxide represented by the composition formula: $SrAl_2O_4$.

13. A thermistor element using the sintered electroconductive oxide according to claim 1.

14. The thermistor element according to claim 13, having a reduction-resistant coating covering the sintered electroconductive oxide.

15. A temperature sensor using the thermistor element according to claim 13.

16. A sintered electroconductive oxide containing a perovskite phase of perovskite-type crystal structure represented by the composition formula:

$M1_a M2_b M3_c Al_d Cr_e O_f$ where M1 is at least one of elements of group 3A other than La;

M2 is at least one of elements of group 2A; M3 is at least one of elements of groups 4A, 5A, 6A, 7A and 8 other than Cr; and a, b, c, d, e and f satisfy the following conditional expressions:

$0.600 \leq a \leq 1.000$;

$0 \leq b \leq 0.400$;

$0.150 \leq c < 0.600$;

$0.400 \leq d \leq 0.800$;

$0 < e \leq 0.050$;

$0 < e/(c+e) \leq 0.18$; and $2.80 \leq f \leq 3.30$, the sintered electroconductive oxide having a temperature gradient constant of 2000 to 3000 K in a temperature range of −40° C. to 900° C.

* * * * *